Nov. 25, 1958 C. A. KRASIENKO 2,862,044
BUSHING SUPPORT FOR ELECTRICAL APPARATUS
Filed Feb. 27, 1957
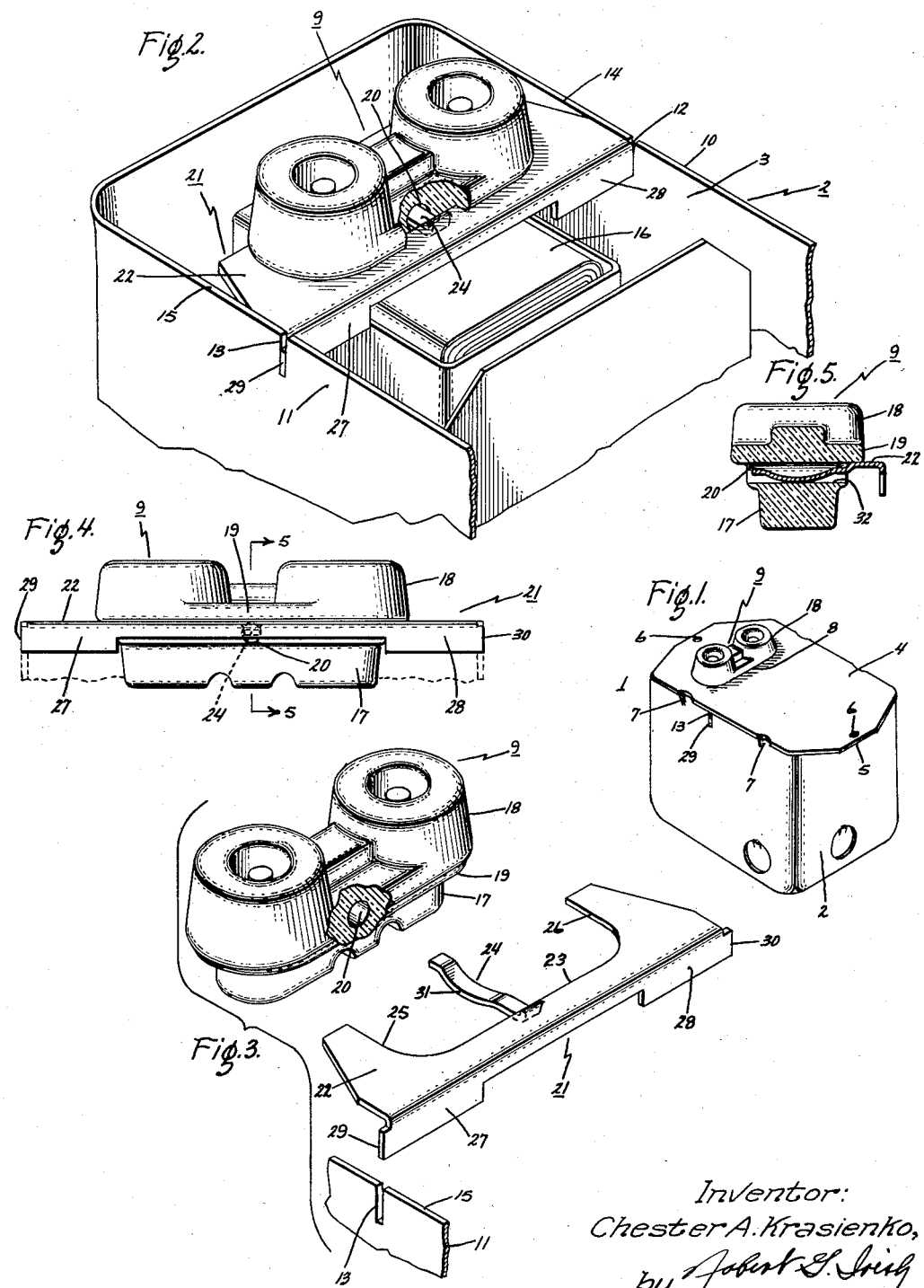
Inventor:
Chester A. Krasienko,
by Robert G. Irish
His Attorney.

United States Patent Office 2,862,044
Patented Nov. 25, 1958

2,862,044

BUSHING SUPPORT FOR ELECTRICAL APPARATUS

Chester A. Krasienko, Fort Wayne, Ind., assignor to General Electric Company, a corporation of New York Application February 27, 1957, Serial No. 642,797

3 Claims. (Cl. 174—152)

This invention relates to electrical apparatus of the type having an enclosing casing and a bushing for making externally electrical connections to the apparatus and more particularly to a bushing support for such apparatus.

Certain electrical apparatus which utilizes or supplies a high potential, such as oil burner ignition transformers, includes an enclosing case and a high voltage bushing for making external electrical connections to the apparatus; in an ignition transformer the bushing serves to connect the high voltage secondary winding of the transformer to the oil burner electrodes. In the design of ignition transformers, it has in the past been customary to support the bushing in the open end of the case by a generally U-shaped bracket spanning opposite side walls of the case and attached respectively thereto by screws; the bushing was in turn secured to the bracket by a suitable retaining pin. A cover or base member closes the open end of the case and has an opening therein through which the bushing projects. The assembly of the bushing on the prior support bracket and the bracket to the casing by means of screws involved an appreciable amount of time-consuming hand labor and thus added appreciably to the overall cost of the transformer. It is, therefore desirable to provide a bushing support arrangement for electrical apparatus which can be assembled readily without the use of screws or other auxiliary fastening and retaining devices, thus reducing the cost of material and assembly of the apparatus.

An improved bushing support arrangement for electrical apparatus which eliminates auxiliary fastening and retaining devices is disclosed in co-pending application Serial No. 642,796, filed February 27, 1957, of Roy H. Dierstein and Harry J. Proxmire and assigned to the assignee of the present application. In the specific embodiment of that application, a casing member for electrical apparatus was provided having an open end with opposite side walls having a pair of transversely aligned openings respectively formed therein. A bushing support bracket member is provided having a first portion with an opening formed therein and with a pair of spaced apart portions depending therefrom and generally perpendicular thereto, each of the pair of portions having an extension formed on its side edge. A bushing is provided having a lower portion and a larger upper portion defining a rim. The lower portion of the bushing is seated in the opening in the first portion of the bracket member with the rim abutting the surface thereof. In order to retain the bushing in the bracket member opening, peripherial slots are formed in the lower portion of the bushing which are engaged by spring tabs formed from the first portion of the bracket member adjacent the opening therein. The bracket member is then positioned with the extensions on the depending portions respectively seated in the side wall openings so that cantilever support of the bushing in the open end of the casing is provided.

While the construction of the aforesaid Dierstein and Proxmire application eliminates the use of all auxiliary fastening and retaining devices, I have provided an improved bushing support which incorporates all of the desirable features of the Dierstein and Proxmire construction in a still simpler, less expensive and more readily assembled arrangement. My construction further makes use of a bushing of the type used in prior constructions rather than the modified bushing as required by Dierstein and Proxmire.

It is therefore an object of this invention to provide an improved bushing support arrangement for electrical apparatus which eliminates the use of auxiliary fastening and holding devices and is more readily assembled than prior constructions.

Another object of this invention is to provide an improved bushing support arrangement for electrical apparatus which incorporates the desirable features set forth above.

Further objects and advantages of this invention will become apparent by reference to the following description and the accompanying drawing, and the features of novelty which characterize this invention will be pointed out with particularity in the claims annexed to and forming a part of this specification.

This invention in one aspect thereof provides a casing member for electrical apparatus having an open end with opposite side walls thereof having a pair of transversely aligned openings respectively formed therein. A bushing for making external electrical connections to the apparatus is provided, the bushing having a transverse opening formed therein. A bushing support bracket member is provided having a pair of portions respectively seated in the side wall openings and another portion positioned in the bushing opening and providing cantilever support for the bushing in the casing member open end.

In the drawing,

Fig. 1 is a view in perspective of a complete oil burner ignition transformer incorporating the improved bushing support arrangement of this invention with the base assembled on the case;

Fig. 2 is a fragmentary view in perspective illustrating the transformer of Fig. 1 with the cover or base member removed;

Fig. 3 is a fragmentary exploded view further illustrating the improved bushing support arrangement of this invention;

Fig. 4 is a fragmentary side elevational view of the bushing and bushing support bracket of this invention; and Fig. 5 is a cross sectional view taken along the line 5—5 of Fig. 4.

Referring now to the figures of the drawing, the ignition transformer 1 is provided with a casing member 2 having an open end 3 which is closed by a cover or base member 4. The base member 4 has suitable projections or feet 5 extending from each end with suitable mounting holes 6 formed therein. Base 4 is secured to casing member 2 in any suitable manner, for example by crimping as at 7, and has an opening 8 formed therein through which bushing 9 extends.

The opposite side walls 10 and 11 of casing member 2 have a pair of transversely aligned slots 12 and 13 respectively formed in their edges 14 and 15 and generally perpendicular thereto. A transformer core and coil assembly 16 for example of the type shown in Patent 2,114,189 to C. W. Kronmiller, and assigned to the assignee of the present application, is shown positioned within casing member 2, it being understood that the specific electrical apparatus which is located in the casing 2 does not form a part of this invention and is shown for illustrated purposes only. The high voltage electrical bushing 9, which is provided for making suitable external electrical connections to the core and coil assembly 16 by means of suitable leads (not shown), is formed of suitable material such as porcelain and has a lower portion 17 and an enlarged upper portion 18 defining a rim 19. A transverse opening 20 extends through the lower portion 17 immediately under rim 19. It will also be understood that the specific form of bushing does not constitute a part of this invention and is here shown for illustrative purposes only.

In order to support the bushing 9 in the open end 3 of casing member 2, a bushing support bracket member 21 is provided having a first portion 22 with a recess 23 formed therein. A tang 24 extends into recess 23 and is substantially centrally located between the sides 25 and 26 thereof. The first portion 22 of bushing support bracket member 21 has a pair of spaced apart portions 27 and 28 depending therefrom and generally perpendicular thereto. Portions 27 and 28 respectively have extensions 29 and 30 formed on their side edges.

The recess 23 of first portion 22 of bushing support bracket 21 conforms substantially to the configuration of lower portion 17 of bushing 9 and bushing 9 is positioned with its lower portion seated in recess 23 and with its rim 19 abutting the upper surface of first portion 22. Tang 24 extends into the transverse opening 20 in bushing 9 and it will be observed that it is deformed axially, as at 31, so that it resiliently engages the wall 32 of opening 20 thereby to retain bushing 9 in the recess 23 with the rim 19 in engagement with the upper surface of first portion 22. The bushing support bracket member 21 with the bushing 9 assembled thereon is positioned spanning the side walls 10 and 11 of casing member 2 with the extensions 29 and 30 of depending portions 27 and 28 respectively seated in slots 12 and 13. It will now be observed that the bushing support bracket member 21 provides cantilever support for the bushing 9 in the open end 3 of casing member 2 without the use of screws or other auxiliary fastening and retaining devices. The assembly is completed by the base member 4 which retains the bushing support bracket member 21 in position.

It will be observed that the bushing 9 can be very readily pushed into position in the recess 23 of bushing support bracket member 21 and is held in this assembled position by means of spring tang 24. The bushing 9 with the opening 20 formed therein is the same type of bushing used in prior constructions in which a separate retaining pin was used to hold the bushing in the bushing support bracket and thus no change in tooling for the bushing is necessitated by this construction. It will be readily apparent that as in the case of the Dierstein and Proxmire construction referred to herein, no auxiliary fastening devices are required to hold the bushing support bracket and the assembled bushing in the casing. Thus, bushing 9 may be assembled on the bushing support bracket 21 and the resulting assembly positioned in the casing member 2 with a minimum of time consuming labor and the elimination of all auxiliary fastening and holding devices effects an appreciable saving in overall cost, which is in no way detrimental to the performance of the apparatus.

While I have illustrated and described a specific embodiment of this invention, further modifications and improvements will occur to those skilled in the art. I desire in the appended claims therefore to cover all modifications which do not depart from the spirit and scope of this invention.

What I claim as new and desire to secure by Letters Patent of the United States is:

1. In electrical apparatus: a casing member having an open end with opposite side walls thereof having a pair of transversely aligned openings respectively formed therein; an electrical bushing for making external electrical connections to said apparatus and having a transverse opening formed therein; and a bushing support bracket member having a generally L-shaped cross-section with one leg portion having a pair of portions respectively seated in said side wall openings and the other leg portion having an integral projection positioned in said bushing opening and providing cantilever support for said bushing in said casing member open end.

2. In electrical apparatus: a casing member having an open end with opposite side walls thereof having a pair of transversely aligned openings respectively formed therein; a bushing support bracket member having a generally L-shaped cross-section with one leg portion having a recess formed in its longitudinal edge, said one leg portion having an integral projection extending into said recess, the other leg portion of said bracket member having a pair of extensions formed on its side edges; and an electrical bushing for making external electrical connections to said apparatus and having a transverse opening formed therein; said bushing being seated in said one leg portion recess with said projection extending into said bushing opening and retaining said bushing in said recess; said bracket member being positioned with said extensions respectively seated in said side wall openings providing cantilever support for said bushing in said casing member open end.

3. In electrical apparatus: a casing member having an open end with opposite side walls thereof having a pair of transversely aligned slots extending respectively from their edges and generally perpendicular thereto; a bushing support bracket member having a generally L-shaped cross-section with one leg portion having a recess formed in its longitudinal edge, said one leg portion having a spring tang extending into said recess, the other leg portion of said bracket member having a pair of extensions formed on its side edges; and an electrical bushing for making external electrical connections to said apparatus and having a transverse opening formed therein; said bushing being seated in said one leg member first portion recess with said tang extending into said bushing opening, said tang being deformed resiliently to engage the walls of said bushing opening thereby to retain said bushing in said recess; said bracket member being positioned with said extensions respectively seated in said side wall openings providing cantilever support for said bushing in said casing member open end.

References Cited in the file of this patent
UNITED STATES PATENTS

| | | |
|---|---|---|
| 2,462,622 | Farrow | Feb. 22, 1949 |
| 2,547,649 | Marsh | Apr. 3, 1951 |